April 25, 1939.   F. RIEBER   2,155,507
WAVE RECORD ANALYZER
Filed Jan. 31, 1938   10 Sheets-Sheet 1
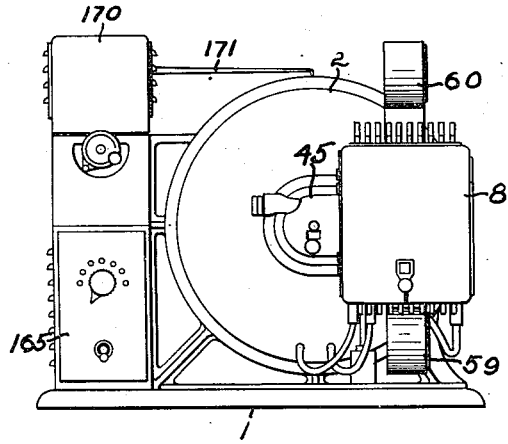
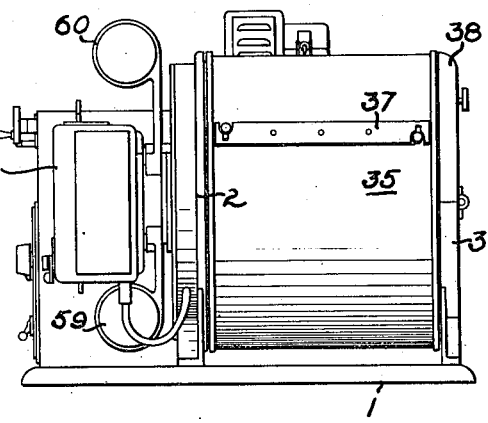
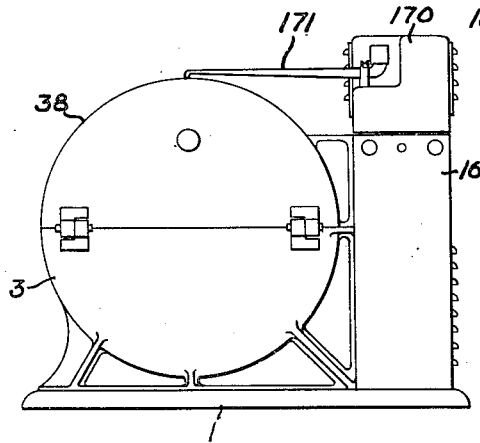
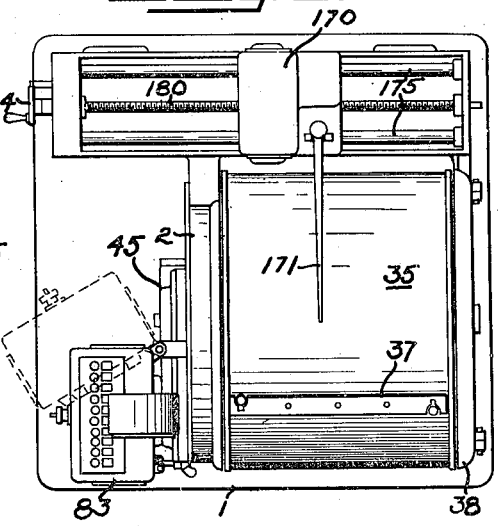
INVENTOR.
FRANK RIEBER.
BY Lippincott & Metcalf
ATTORNEYS.

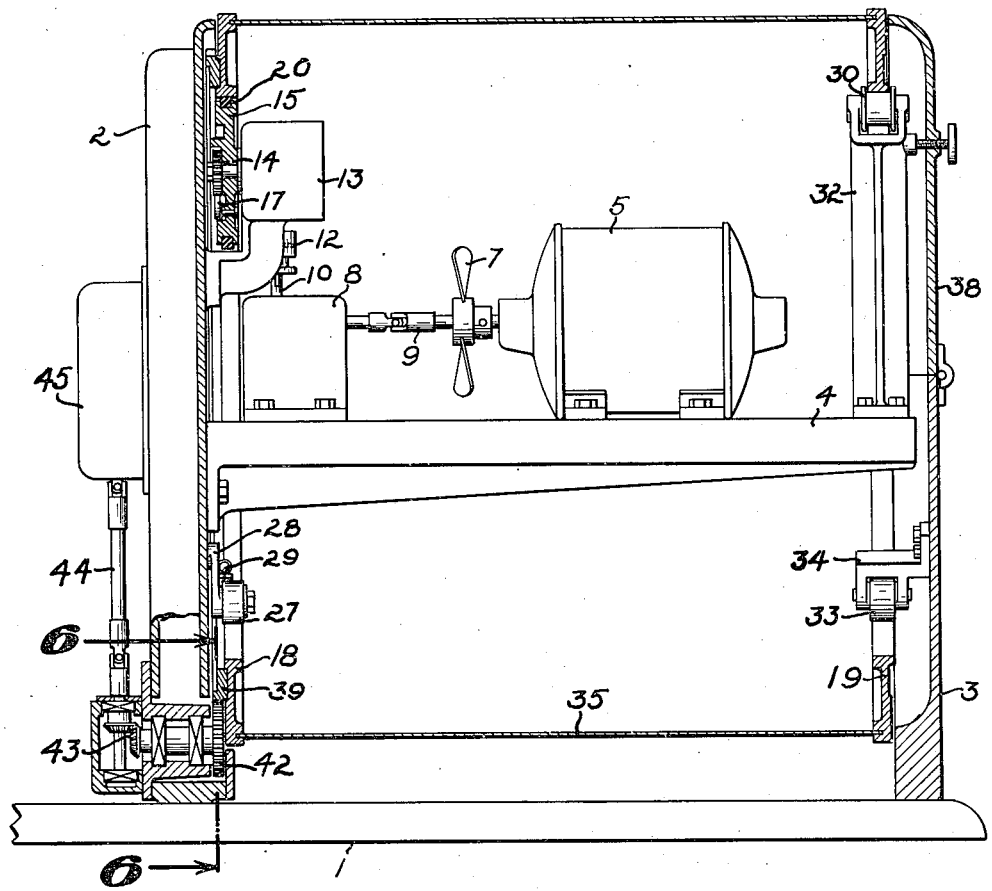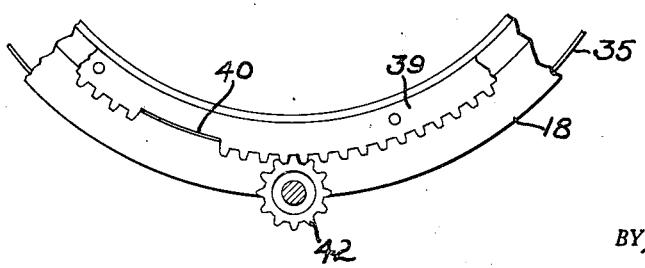

April 25, 1939.   F. RIEBER   2,155,507
WAVE RECORD ANALYZER
Filed Jan. 31, 1938   10 Sheets-Sheet 3
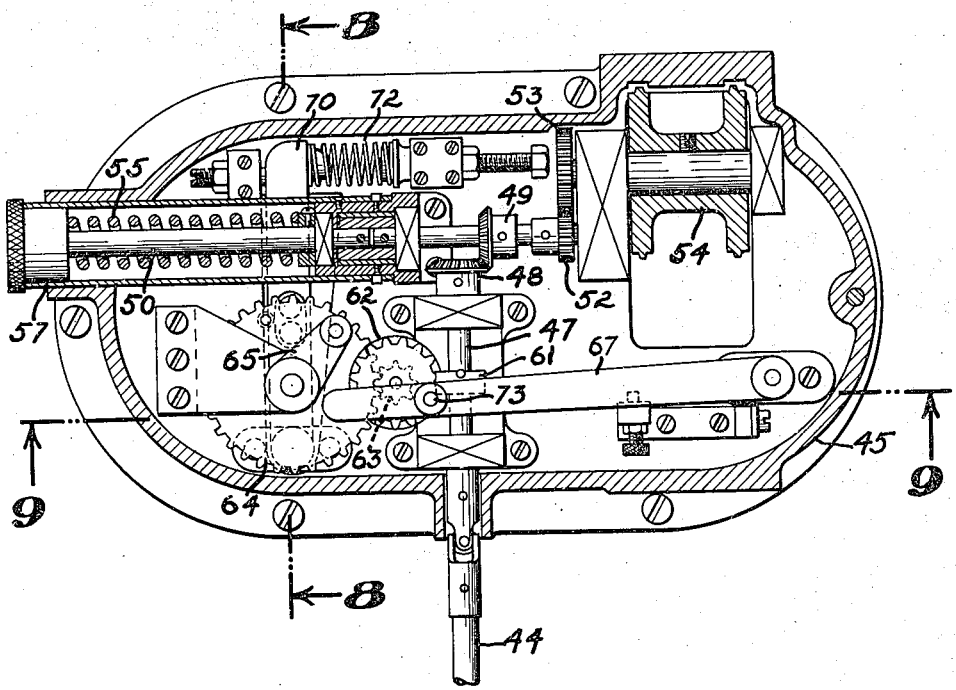
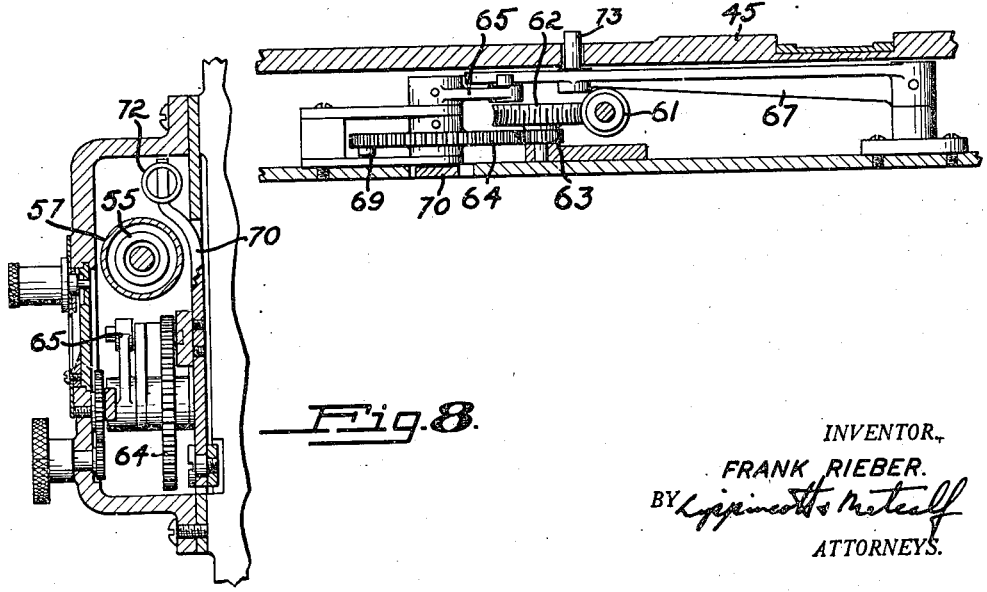
INVENTOR.
FRANK RIEBER.
BY
ATTORNEYS.

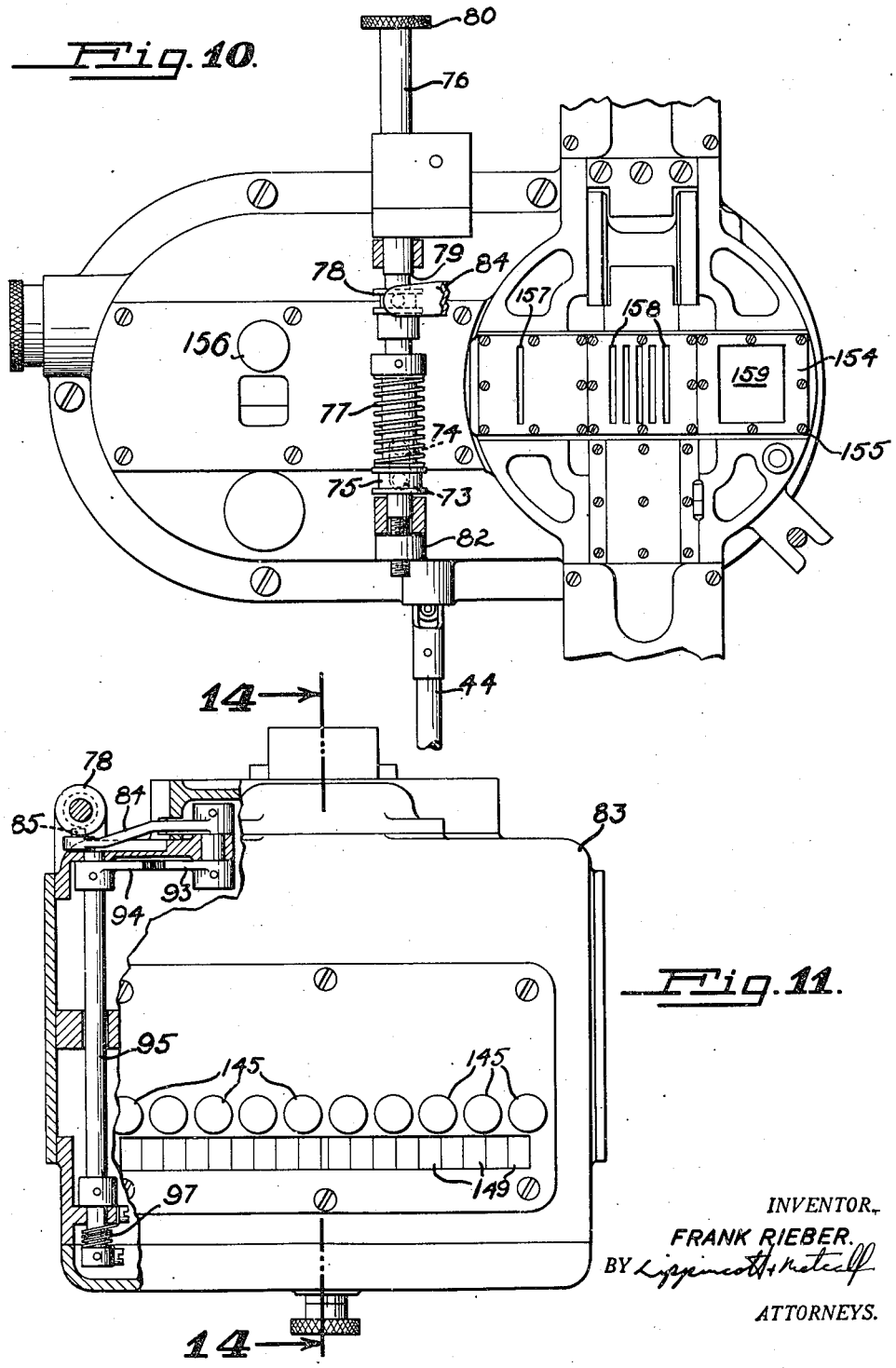

April 25, 1939.  F. RIEBER  2,155,507
WAVE RECORD ANALYZER
Filed Jan. 31, 1938   10 Sheets-Sheet 6

INVENTOR,
FRANK RIEBER.
BY
ATTORNEYS.

INVENTOR,
FRANK RIEBER.
BY Lippincott & Metcalf
ATTORNEYS.

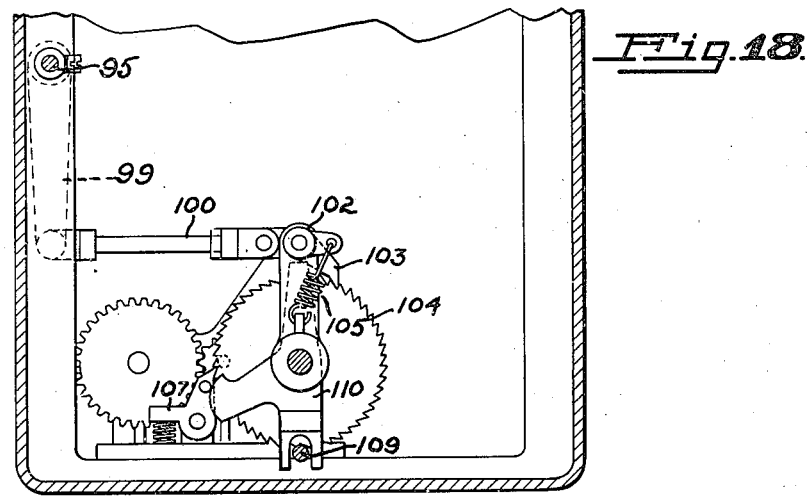
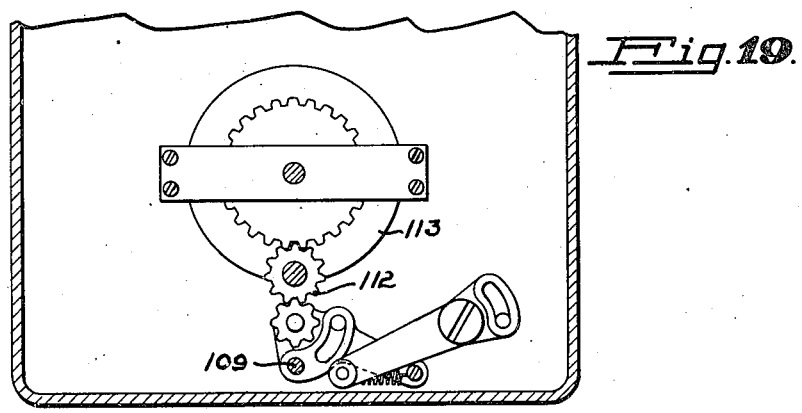

April 25, 1939.  F. RIEBER  2,155,507
WAVE RECORD ANALYZER
Filed Jan. 31, 1938  10 Sheets-Sheet 9

INVENTOR,
FRANK RIEBER.
BY
ATTORNEYS.

April 25, 1939.  F. RIEBER  2,155,507
WAVE RECORD ANALYZER
Filed Jan. 31, 1938   10 Sheets-Sheet 10

INVENTOR,
FRANK RIEBER.
BY
ATTORNEYS.

Patented Apr. 25, 1939

2,155,507

UNITED STATES PATENT OFFICE 2,155,507

WAVE RECORD ANALYZER

Frank Rieber, Los Angeles, Calif., assignor of one-half to Continental Oil Company Application January 31, 1938, Serial No. 187,989

10 Claims. (Cl. 181—0.5)

This invention relates to apparatus and methods for analyzing complex waves, and particularly to a form of analyzer which is especially adapted for use in connection with the methods described in my prior applications Serial Nos. 746,861 and 758,834 (Patent No. 2,051,153), filed October 3, 1934, and December 18, 1934, respectively.

The prior applications referred to describe a method of analyzing complex waves, and particularly seismic waves for use in geophysical mapping of geological structures. In the method referred to, the waves are usually (although not necessarily) initiated by an explosion. The primary waves resulting from such an explosion is propagated through the earth and is in part reflected, refracted and diffracted by the various changes in structure which it encounters, and portions of the reflected and diffracted wave fronts return to the earth's surface. The return portions of the wave are picked up at a general position spaced in known distance and direction from the point of explosion by a plurality of microphones or "geophones" carefully spaced along a known base line or base lines, and are recorded phonographically as a plurality of parallel sound tracks on the same recording medium.

In the case of the particular embodiment of the invention here-described, this medium is a length of motion picture film which carries ten sound tracks which are simultaneously recorded side by side. Additional tracks are also provided, first, to show the instant at which the explosion occurred with relation to its time of arrival at the geophone and, second, a timer trace which is preferably merely a 1,000 cycle wave which is impressed continuously on the record from start to finish of each recording.

The record thus formed is analyzed by phonographically reproducing the record just described with the outputs of each of the plurality of record traces or sound tracks mixed in a single channel. This channel is connected to a recording galvanometer, through suitable amplifiers and filters, which makes a trace of the ordinary oscillograph variety, this trace representing the composite output of all of the geophones. In general, each of these geophones will have been at a different distance from the source of the impulse, as measured along its path, and hence the wave fronts will have reached each of them at a slightly different time. If the velocity of the wave in the earth is known, the difference in distance traveled by the wave in reaching each phone can be computed from the difference in time of arrival, and from this can be deduced the direction from which the wave arrived and hence the position of the structure from which it was reflected.

The method utilized to analyze the incoming waves and make the deductions referred to is to make repeated traces of the combined output of the geophones as recorded on the sound tracks, displacing the points of take-off on the respective tracks by known amounts after each successive trace. If proper precautions be taken, a position can then be found where each of the take-off points is displaced by an amount which is equivalent to the distance the recording film has traveled in the difference of time which the wave required to travel to the various geophones. At the distances used in practice the curvature of the wave-fronts is negligibly small, and hence the reproducing slits or take-off points will lie in a straight line which is perpendicular to the motion of the film if the wave happened to reach all of the phones simultaneously, and is at some oblique angle to the direction of motion under other conditions. When the displacement of the take-off points is accurately made, the same wave, as received on the different geophones, will be fed into the recorder in the same phase, and each of the sound tracks will reinforce each of the others as far as that particular wave train is concerned, giving a maximum amplitude of swing to the recording galvanometer. For any other position of the take-off points, the reinforcement will be less or there will be a partial or complete cancellation, as between the various sound tracks. Since the same initial wave will frequently be reflected or diffracted by many different strata, the position of the take-off points at which maximum reinforcement occurs will be different for different reflections, and if a sufficient number of retracings of the record is made it will be found that maxima of different wave trains will be found on different traces; that data as to many different strata can be determined from the same record, and that extremely complicated structures may be plotted from recordings of a relatively few explosions.

Among the precautions to be taken in making and analyzing records of the type referred to are, first, the accurate spacing of the geophones along a selected base line and, second, the elimination of errors which might arise through the fact that the weathering of the surface layer is ordinarily not uniform and that therefore there will be a constant error in the positioning of the take-off points if this non-uniform weathering be not compensated for. A complete analysis of the record furthermore requires the accurate comparison of a large number of retracings of the record and a third precaution is to insure that each trace is made in its proper relative position to the others.

With the above in view, the objects of this invention include: the provision of apparatus in which the movement of the original phonographic record and the medium upon which the traces of the combined sound tracks is produced are exactly correlated; the provision of apparatus wherein the take-off points on the sound tracks may be successively displaced by predetermined increments in making successive retracings; the provision of means for making individual corrections on each take-off point to compensate for non-uniform weathering; the provision of an apparatus wherein the displacement of the take-off points or reproducing slits does not affect the frequency response of the equipment as a whole; and, in general, the provision of an apparatus wherein the making of the large number of traces required for the satisfactory analysis of these waves is facilitated and made as nearly as possible automatic.

Other objects and advantages of this invention will appear in the specification and claims to follow, but I do not wish to be limited to the exact form of the equipment as shown except as limited by the claims.

Broadly considered this invention involves the combination of a mechanically driven carrier on which the various traces are made, this carrier being preferably in the form of a drum which is supplied with means for holding a band of paper around its periphery. Mechanically interlinked with the carrier referred to are means for driving a phonographic record in a fixed relationship thereto. Since the record is preferably a length of motion picture film carrying a plurality of sound tracks, there is provided a take-off or reproducing head comprising a separate reproducing slit or aperture for each of the sound tracks. Means are provided whereby at each revolution of the drum the successive apertures are displaced by predetermined increments with respect to each other so as to alter the point at which the take-off from the film occurs, and there is further provided an individual adjustment for each of the apertures which remains constant, irrespective of the displacement above referred to for making the weathering compensation. An exciter lamp is provided with an accompanying optical system such that all of the apertures are illuminated uniformly irrespective of their displacement, and the light passing through the apertures falls upon a common photocell. The photocell feeds into the usual amplifier, whose output is fed into a recording galvanometer having a pen or other recording point positioned to make a peripheral trace upon the paper carried by the drum. The apparatus is so arranged that upon each successive revolution of the drum a separate trace is formed, means being provided automatically to displace the apertures and to advance the pen axially of the drum between successive revolutions thereof.

Referring to the drawings, Fig. 1 is a front elevation of the complete equipment, the word "front" as used herein always signifying the end of the device from which it is operated.

Fig. 2 is a side elevation of the analyzer, as viewed from the right.

Fig. 3 is a rear elevation of the device.

Fig. 4 is a plan view of the analyzer.

Fig. 5 is a vertical section through the recording drum and its supports, showing a portion of the interlock between the drum and the film drive.

Fig. 6 is a detailed view of a portion of this interlock, the plane of view being indicated by the dot and dash line 6—6 of Fig. 5.

Fig. 7 is a vertical sectional view through the film drive housing showing a portion of the mechanism used for returning the film to its original position after each successive trace, the plane of section being parallel to the front of the apparatus.

Fig. 8 is a vertical section parallel to the axis of the recording drum, as indicated by the dot and dash lines and arrows 8—8 in Fig. 7.

Fig. 9 is a fragmentary sectional view taken in a horizontal plane as indicated by the lines and arrows marked 9—9 in Fig. 7.

Fig. 10 is a view showing the front of the film drive housing and the recording gate through which the sound tracks are reproduced, the plane of view being parallel and in front of the plane of Fig. 7.

Fig. 11 is a top view of the reproducing head, a portion of the top being cut away to show some of the detail within.

Figs. 18 and 19 are oppositely directed partial sectional views each being taken from the plane of section indicated by the dot and dash line in Fig. 14 and the aspects being in the direction of the arrows marked by the respective figure numbers.

Figure 12:
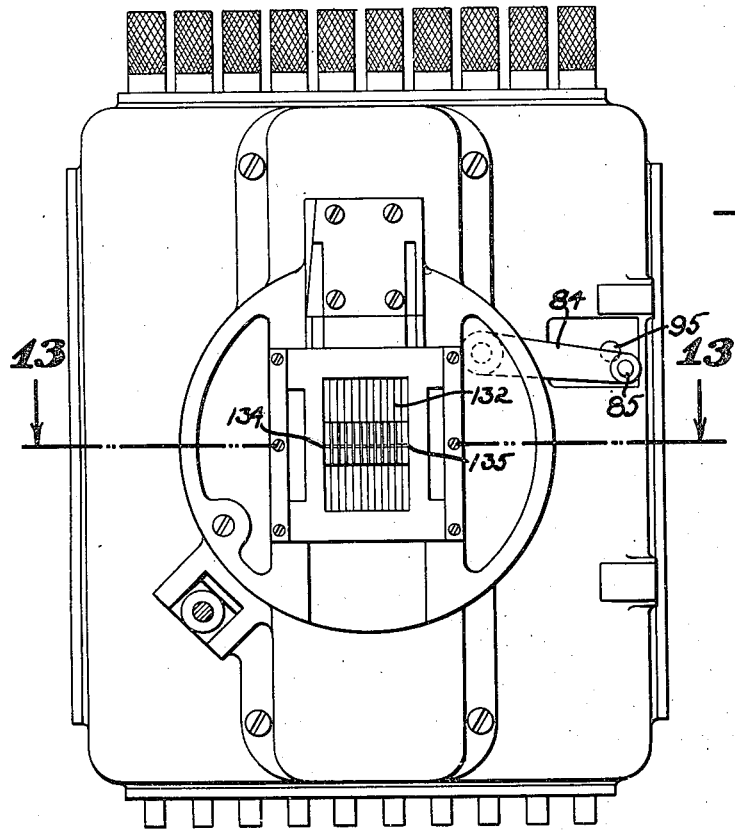
Fig. 12 is a rear view of the same head.
Figure 13:
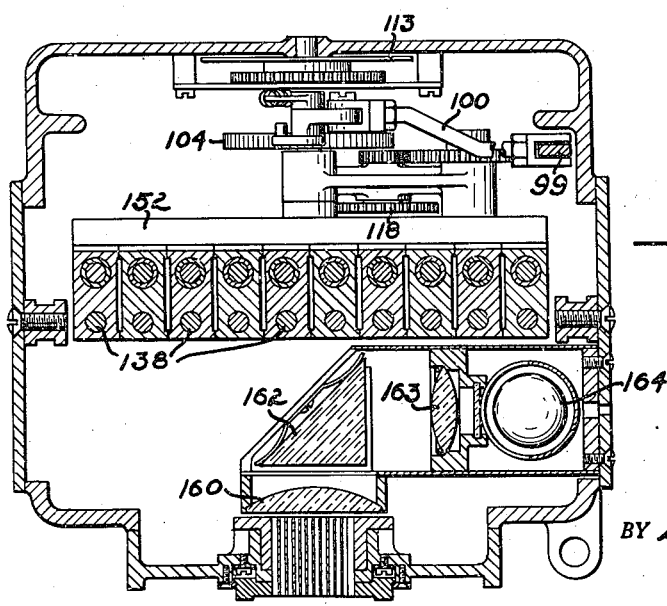
Fig. 13 is a horizontal sectional view through the reproducer head, the plane of section being indicated by the dot and dash lines 13—13 of Fig. 12.

Considering in detail the embodiment of my invention chosen for specific illustration in this specification, it comprises a frame consisting of a base 1 and front and rear upright members 2 and 3, respectively, which carry the recording drum of the other mechanisms referred to. These uprights are generally circular in form and serve not only as supports, but also as closures for the ends of the drum and housing for the mechanism enclosed therein. Extending to the rear from the center of the forward housing is a bridge 4 on which is mounted a drive motor 5 and certain other equipment as will later appear.

The drive motor shaft is provided with a ventilating fan 7 and drives a worm reduction gear 8 through a universal joint 9.

Extending vertically from the reduction gear is a slow speed shaft 10 which is divided by a pin or jaw clutch 12 and which drives a second reduction gear 13, this latter reduction gear also being of the worm type.

The horizontal shaft of the gear 13 carries a ratchet wheel 14 and a drum drive wheel 15 which is freely pivoted on the shaft and is driven by a pawl 17 which engages the ratchet wheel, so that the drive wheel may be advanced in its normal direction of motion without the necessity of operating various reduction gears or the motor.

The recording drum itself is rotatable, not upon a shaft but upon rollers mounted on the front and rear frames respectively. These rollers engage annular drum frames 18 and 19 respectively, the inner surfaces of these drum frames being surfaced to form smooth bearing surfaces whereon the rollers engage. The first of these rollers is the drive wheel 15, which is provided with a rubber tire 20, forming a driving contact having a high coefficient of friction. The drawings show but one of the other rollers at the front end of the device, this roller 27 being mounted on a bell crank 28 and urged into contact with the drive surface by spring 29. The other roller is similarly mounted on the side of the device toward the observer in Fig. 5. The three rear rollers merely act as guides and supports, the upper roller 30 at the rear being mounted on a strut 32 which extends upward from the bridge 4 and the lower rollers 33 being mounted on adjustable brackets 34, fixed to the rear end frame 3.

Connecting the two drum frames 18 and 19 is the sheet metal drum 35 itself which forms the surface upon which the record strip is stretched and held by a suitable clamp 37. The drum constitutes the housing for the drive motor and other equipment mounted on the bridge, this housing being completed by a hinged door 38 which forms the upper half of the rear support 3 and opens to give access to the motor and other equipment described.

Fixed to the annular drum frame 18 is a ring gear 39, which is mutilated as shown in detail at 40 by the omission of several teeth. The ring gear drives a pinion 42 which actuates the film drive through a set of bevel gears 43. The driven gear is fixed to a vertical shaft 44 which is preferably provided with universal joints and extends upwardly from the drive in the base of the front frame 2 into the film drive housing 45.

The mechanism within this housing is best shown in Figs. 7 to 10 inclusive. Mounted on the upper extension 47 of the shaft 44 is a bevel gear 48 which engages a second gear 49 mounted on a horizontal shaft 50. At one end of the shaft is a spur pinion 52 which meshes with a gear 53 driving a film sprocket 54. Connected to the other end of the shaft 50 is a helical spring 55 encased in a tubular guard 57.

It will be seen that as the drum revolves, driven by the drive wheel 15 it will actuate the vertical shaft 44 to drive the sprocket 54 and at the same time wind up the spring 55. At the end of each revolution of the drum, however, when the spring gear 42 encounters the mutilated section of the ring gear 39 the spring 55 will unwind, thereby reversing the motion of the sprocket and returning the film to its original position. The film used is in relatively short lengths. It is not mounted on spools, but is enclosed in casings 59 and 60, as shown in Figs. 1 and 2, wherein it is permitted to coil itself freely. Repeated tests have shown that no tangling or jamming of the film occurs and there is therefore no necessity for the provision of complicated take-ups, the main drive sprocket being the only film moving element required.

Hinged to the frame immediately in front of the film drive housing is the reproducing head, and means are provided for causing the motion of the film to actuate mechanism within this head which will shift the relative positions of the reproducing apertures mounted therein by a fixed relative amount after each rotation of the drum, i. e., to move the apertures in echelon so that they are alined across the film at an angle which changes by a predetermined amount between each successive pair of traces.

Mounted on the vertical shaft extension 47 is a worm 61 driving a worm wheel 62 which is mounted on a stub shaft and fixed with a small spur pinion 63. Pinion 63 meshes the gear 64, and this gear drives a crank 65 engaging a lever 67. The interrelation of the crank 65 and lever 67 may best be seen in Fig. 9. The crank 65 travels counterclockwise during the time that the film is being positively driven by the motion of the drum, and engages the tip of the lever 67 and raises it at the end of this portion of the cycle of operation. The drive pinion 42 encounters the mutilated portion of the gear 39 immediately thereafter, the spring 55 unwinds, and brings the film back to its original position. A positive shock absorbing stop to this return motion is provided through a pin 69 on the gear 64 which hits a vertical pivoted lever 70, the chock of the impact being taken on a spring 72.

The motion of the lever 67 is transmitted through the front of the housing 45 by a pin 73, carried by the lever arm, this pin extending through the slot 74 in the front of the housing 45 and engaging a collar 75 which is slidably mounted on a vertical shaft or pin 76. The collar 75 carries a compression spring 77, upon the upper end of which is mounted a second sliding collar 78. Upward movement of the second collar is limited by a stop shoulder 79, and the position of the latter can be adjusted by rotating the shaft 76 by means of the knurled head 80, the lower end of the shaft being threaded into a lug 82 carried by the housing.

The reproducing head 83 is hinged upon this same vertical shaft 76 and a lever 84 is pivotally mounted on the rear wall of the housing in such position that a pin 85 on the end thereof will engage a groove in the collar 78. Hence when the lever 67 within the film drive housing is raised its motion will be transmitted through the collar 75, spring 77, and collar 78 to the lever 84. The motion thus transmitted is limited by the adjustment of the stop 79, and since the reproducing head is hinged on the pin 76, the interrelation of the parts is not affected by swinging the head out for threading the film, or other service, as is shown in the dotted lines of Fig. 4.

Fixed to the same shaft as the lever 84 is a gear sector 93 through which motion is communicated to a similar sector 94 and thence to a horizontal shaft 95 which extends forwardly to the front of the reproducer head housing. A tension spring 97 is provided on the end of this shaft to take up the back lash of the driving train.

Fig. 11 best shows connections between the lever 84 and the shaft 95. This shaft is also shown in Fig. 18, which latter figure also indicates a downwardly extending lever 99, mounted on the same shaft, and carrying at its end an adjustable link 100. Motion transmitted from the film drive housing is therefore communicated through this linkage to a crank 102 which carries a pawl 103 engaging a ratchet wheel 104, a spring 105 serving to keep the pawl constantly engaged with the ratchet wheel. A detent 107, also spring actuated, prevents reverse rotation of the ratchet wheel. Means are provided, however, for releasing one or both of the pawl and detent. A small lever 108, shown in the lower right-hand portion of Fig. 14, actuates crank 109 to swing the member 110 (Figs. 14 and 18) to raise both cam and detent, which permits the manual rotation of the ratchet wheel 104 by means of the knob 111 geared to the ratchet shaft through a pinion 112 and thence to a dial or index plate 113 which shows the setting of the ratchet wheel, and hence, as will be shown, of the reproducing apertures. Fig. 19 shows the structure which keeps the detent release normally out of action.

Figure 16:
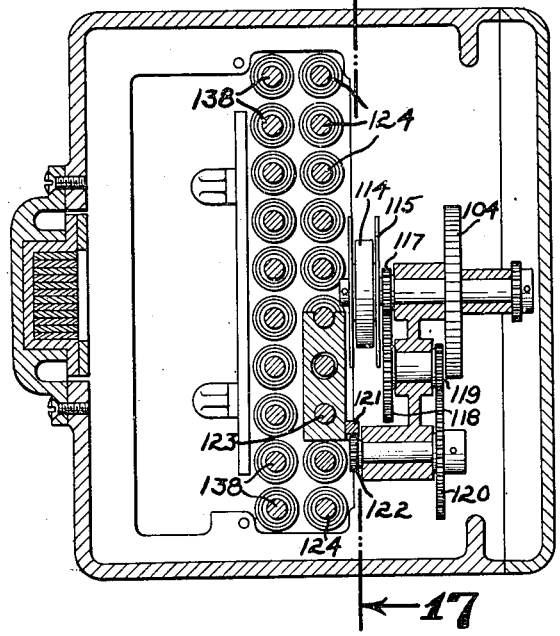
Fig. 16 is another transverse section whose plane is indicated by the line 16—16 of Fig. 14.
Figure 20:
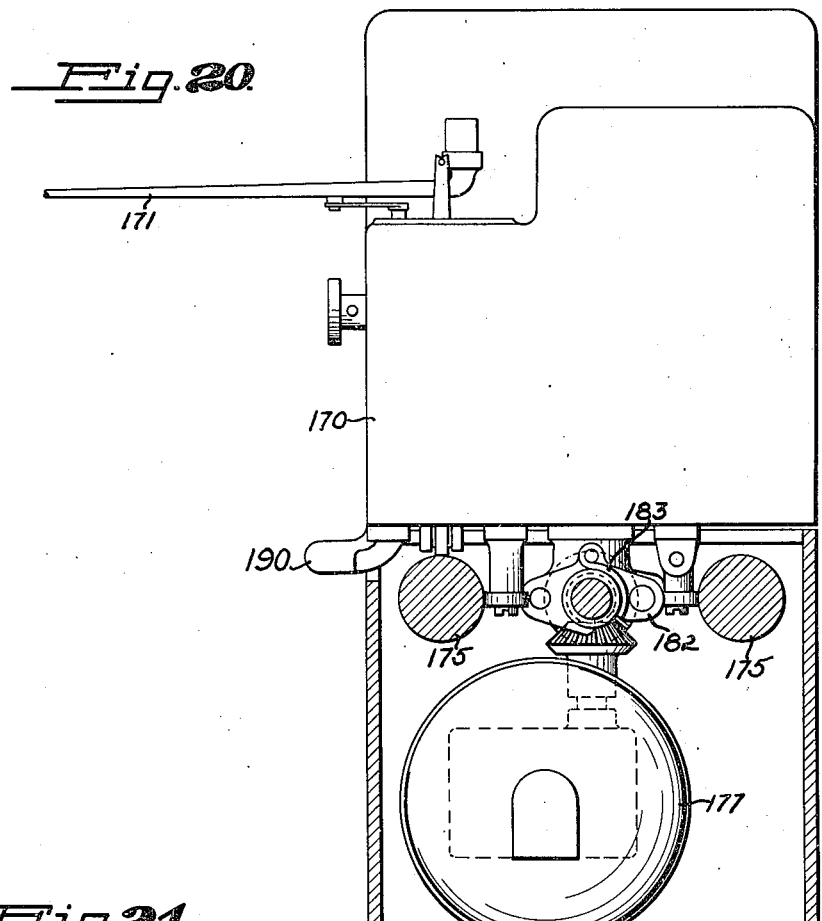
Fig. 20 is a view partly in elevation and partly in section showing the galvanometer and pen carriage and certain details of its drive.
Figure 21:
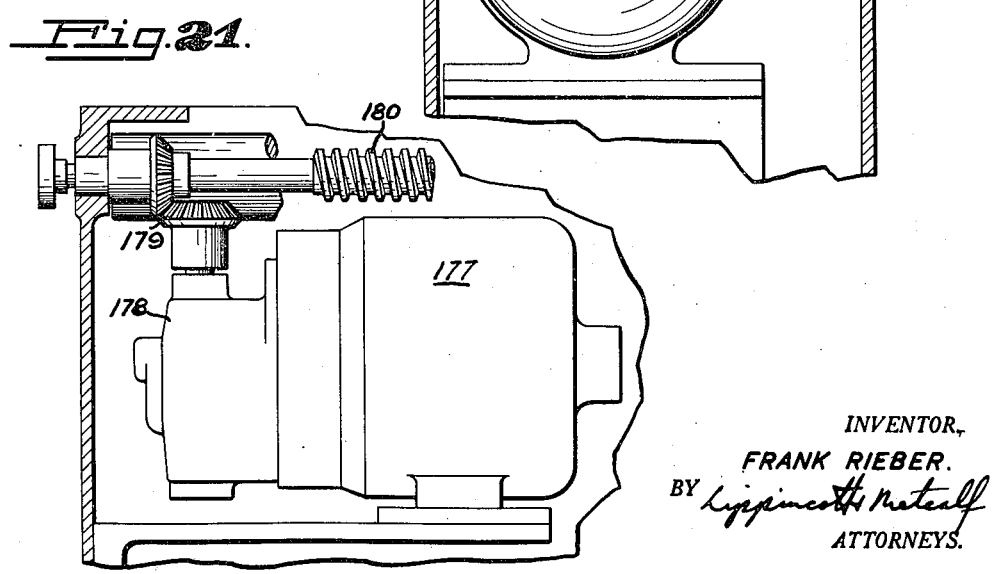
Fig. 21 is a fragmentary view partly in section and partly in elevation showing the motor drive for advancing the pen carriage.
Figure 22:
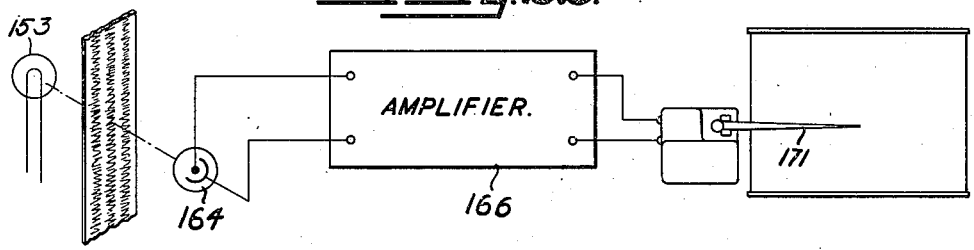
Fig. 22 is a schematic diagram of the electrical connections of the analyzing system.
Figure 23:
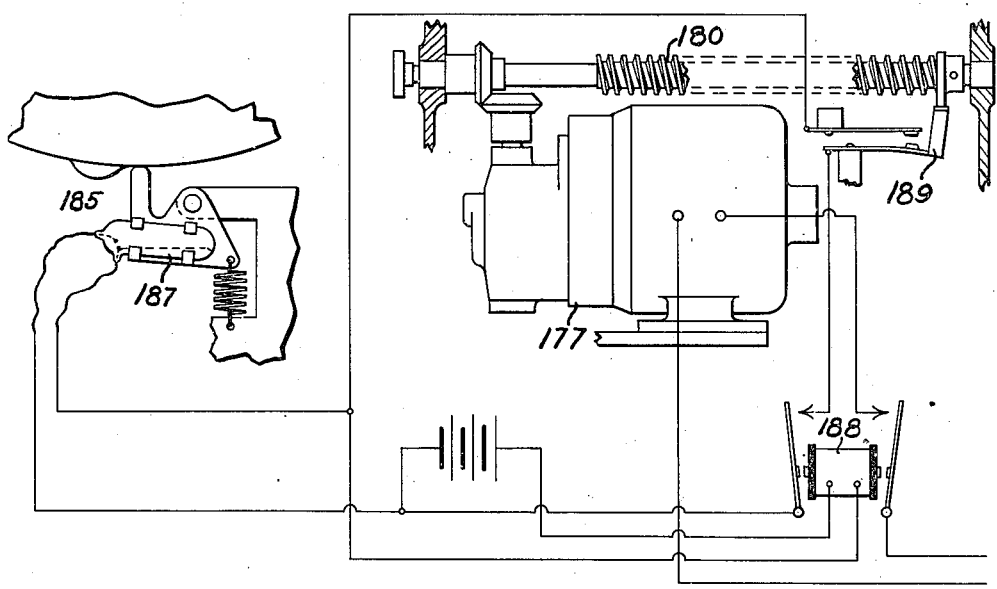
Fig. 23 is a showing, partly schematic, of the pen carriage drive.

Back lash is taken out of the ratchet shaft by means of a clock spring 114 mounted on a drum 115 at the rear end of the shaft. Geared to a pinion 117 on this same shaft through a train, best shown in Fig. 16, and comprising gears 118, 119 and 120 is a rack 121 which is fixed to a vertically slidable rod 123. This rod is the third of a series of ten (the others of the series being designated by the reference character 124) which are mounted in transverse alinement across the reproducer head and whose function is to adjust the position of the reproducing slots with relation to each other and to the film. It will be seen that the motions which have thus far been described will cause the rack 121 to advance by a fixed increment at the end of each cycle of operation of the drum. The increment may be adjusted as has already been stated by turning the knurled head 80 on the reproducer head hinge. Each of these vertical rods is connected to a single one of the apertures and advances or retracts it proportionally to its position in the series, as will next be described.

Figure 14:
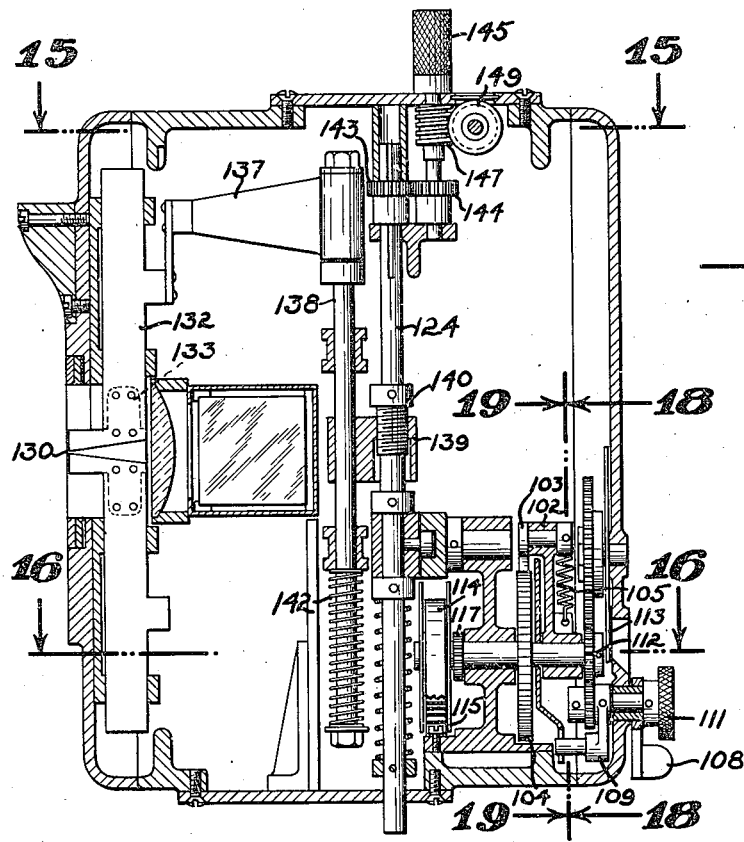
Fig. 14 is a vertical section whose plane is indicated by the dot and dash lines 14—14 on Fig. 11.
Figure 15:
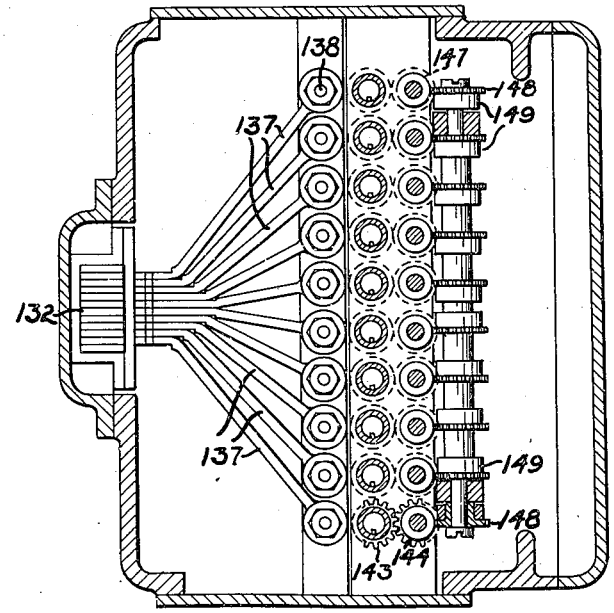
Fig. 15 is a horizontal section through the reproducing head, the plane being immediately below the top of the housing as indicated by the line 15—15 in Fig. 14.
Figure 17:
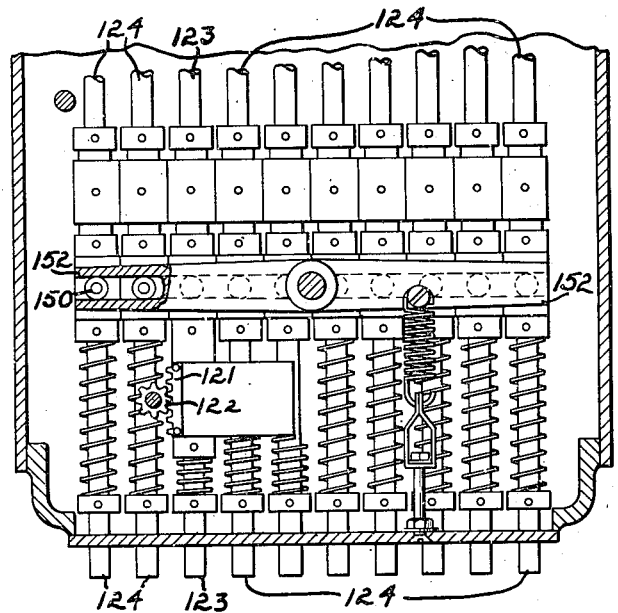
Fig. 17 is a partial vertical section whose plane is indicated by the line 17—17 in Fig. 16.

The individual apertures 130 are formed in a series of mutually slidable plates 132, these apertures being wedge shaped, and each of the mutually slidable plates being divided into two parts, held together by a thin sheet junction plate 133 as indicated at the left center of Fig. 14. Fig. 12 shows the rear view of this assembly with the apertures in alinement, together with two fixed apertures 134 and 135 which are mounted on each side of the mutually slidable ones. The slidable aperture plates 132 are connected through offset arms 137 with individual sliding shafts 138. Each of these shafts carries a block 139 into which is threaded a screw collar 140 which is fixed to one of the individual shafts 123 or 124. The lower end of each of the shafts 138 carries a compression spring 142 to take up back lash. The shafts 123 and 124 are each splined to a pinion 143 which is driven through a meshing gear 144 by a knurled thumb piece 145. This thumb piece also carries a worm 147 which drives a worm wheel 148 carrying an index wheel 149. It will therefore be seen that by rotating the thumb piece 145 the relative position of the aperture 130 can be changed with respect to the others of like character, the change thus made being individual and permanent until reset, and the amount of the change being clearly indicated by the indices 149. At the same time the shafts 123 and 124 may be slid vertically without changing this individual setting. Each of these shafts carries a pin 150 which engages a groove or channel in a rocker arm 152. This rocker arm is pivoted at its center, and therefore the movement imparted to the vertical shaft 123, as already described, is translated into a proportional motion of each of the other shafts 124. This causes the recording apertures 130 to advance in an echelon formation at the end of each cycle of operation of the drum.

Except for the individual weathering corrections as set by the thumb pieces 145, which corrections are usually small, the aperture centers remain on a straight line. When the analysis of a record is started this line extends diagonally downward from left to right when viewed from the aspect of Fig. 12. When half of the traces of an analysis have been made the apertures will be alined normally to the motion of the film, in the position shown in Fig. 12, and when the retracings are completed the apertures will be again diagonally disposed, but now downward from right to left. The pawl and detent are then released and the apertures are reset by means of the knob 111 to the proper starting position as shown by the index dial 113.

Mounted within the drum behind the film gate 154 (Fig. 10) in the front of the film drive housing is an exciter lamp 153 so positioned as to illuminate all of the reproducing apertures at the same time. The gate 154 is slidable in horizontal ways 155 driven by rack-and-pinion from the knob 156 and I prefer to make this gate with three different sets of apertures. The first of these apertures 157 is wide enough to embrace but a single reproducing slit or aperture and is primarily used when making a record from one of the fixed apertures 134 or 135, which register with the track made by the timing trace and the record of the explosion time. The second aperture set 158 comprises five vertical slits so spaced as to engage every alternate one of the reproducing slits, while the third aperture arrangement 159 embraces all ten of these slits. The gate is movable so that any one of the three sets of apertures may be used and so that the second set of apertures 158 may be used to select either the odd or even numbered reproducer slits. This arrangement is convenient because it is frequently desirable to record the wave, received by two sets of geophones on the same film as, for example, when one set of five geophones is arranged on a base line which is alined with the position on the earth's surface of the original impulse or explosion, while the second set of five geophones is positioned on a base line normal to the first. It will be understood that there are also occasions when the entire set of geophones are alined along the same base line in which case the aperture 159 would be used.

Immediately in front of the reproducing apertures is an optical system comprising a lens 160, a right angle totally reflecting prism 162 and a second lens 163 which serve to focus the light passing through the film and the reproducing apertures upon the photo cell 164. This photocell is connected through conventional circuits with an amplifier 166 and an adjustable frequency filter which is housed in the casing 165 shown at the left of Fig. 1.

The output from the amplifier is fed into the recording galvanometer mounted in a movable head 170. The pen or other reproducing point 171 of this galvanometer bears upon the drum surface, and, since the light from all of the reproducing apertures is combined in the same photocell, the output current of the amplifier will be proportional to the algebraic sum of the components of each of the sound tracks on the film in a time phase which is determined by the relative positions of the reproducing apertures 130.

Means are provided for advancing the galvanometer housing 170 parallel to the axis of the recording drum and along a set of ways 175, such motion occurring at the end of each revolution or cycle of the drum. Various methods of accomplishing this are obviously possible. I prefer, however, to use a separate motor 177 mounted above the amplifier 165 in which a reduction gear 178 drives a set of bevel gears 179 and thence a lead screw 180 which extends between the ways 175. A split lead nut 182 is held in engagement with the lead screw by spring 183.

A hand wheel 184 is provided for making the initial setting of the pen carriage and for any minor adjustments that may be necessary in the course of a wave analysis. Normally, however, the entire motion of the pen carriage during such an analysis is accomplished by the motor 177. A cam 185 is provided on the periphery of the drum for actuating a momentary contact mercury switch 187 which starts the motor and closes a relay 188 which keeps it in operation until the lead screw 180 has made a single turn, which opens the circuit again, by means of the cam-operated contractor 189, until the drum cam again operates. It is also convenient to provide an interlock between the pen carriage and the pin clutch 12 which opens the clutch and causes the device to shut off automatically when the final tracing has been made.

Figure 24:
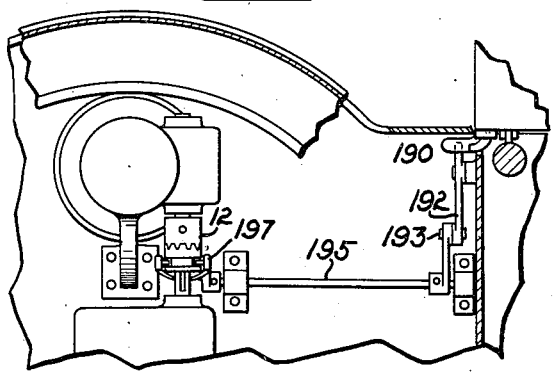
Fig. 24 is a fragmentary sectional view showing a mechanical interlink between the pen carriage and drum drives.

This is accomplished as shown in Fig. 24. At the end of the pen-carriage travel the lug 190 on the carriage strikes a lever 192. A fork on the lower end of this lever engages a crankpin 193 carried by a rocker shaft 195, a yoke 197 on the other end of this shaft actuating the clutch.

It will be seen that the device here described and claimed will, when once started in operation, execute as many traces as may be required for a complete analysis of a wave record. It will advance the time phase of the successive recordings by accurately predetermined increments, and it will so space the successive traces upon the final trace record as to enable the analysis to be made with confidence that the differential times assumed for the arrival of the waves represent the actual facts of the case.

I claim:

1. A wave record analyzer comprising means for driving a trace record, means for driving a phonographic record in fixed space relation to the movement of said trace record, means for simultaneously reproducing a plurality of sound tracks from said phonographic record into a common sound channel, a recording point connected to be driven from said sound channel and positioned to form a trace on said trace record, and means for altering the relative time phase relationship of the points on the various sound tracks from which reproduction occurs.

2. A wave record analyzer comprising means for driving a trace record, means for driving a phonographic record in fixed space relation to the movement of said trace record, means for simultaneously reproducing a plurality of sound tracks from said phonographic record into a common sound channel, a recording point connected to be driven from said sound channel and positioned to form a trace on said trace record, and means for making simultaneous proportional alterations in the relative time phase relationships of the points on the various sound tracks from which reproduction occurs.

3. A wave record analyzer comprising means for driving a trace record, means for driving a phonographic record in fixed space relation to the movement of said trace record, means for simultaneously reproducing a plurality of sound tracks from said phonographic record into a common sound channel, a recording point connected to be driven from said sound channel and positioned to form a trace on said trace record, and means for making simultaneous proportional alterations in the relative time phase relationships of the points on the various sound tracks from which reproduction occurs, and additional means for making individual alterations in the relative positions of said points.

4. A wave record analyzer comprising a rotatable drum for carrying a trace record, means for rotating said drum, a film drive sprocket geared to move concurrently with said drum, means for reversing the direction of rotation of said sprocket at the end of each such rotation to return a film driven by said sprocket to its initial position relative to the angular position of said drum, a plurality of reproducing apertures positioned to coact with a plurality of sound tracks recorded on said film, means coacting with said apertures for translating said sound tracks into electric currents flowing in a common channel, a recording galvanometer connected to said channel and positioned to form its record trace upon the record carried by said drum, and means for shifting the relative positions of said apertures along said sound tracks upon completion of each revolution of the drum.

5. A wave record analyzer comprising a rotatable drum for carrying a trace record, means for rotating said drum, a film drive sprocket geared to move concurrently with said drum, means for reversing the direction of rotation of said sprocket at the end of each such rotation to return a film driven by said sprocket to its initial position relative to the angular position of said drum, a plurality of reproducing apertures positioned to coact with a plurality of sound tracks recorded on said film, means coacting with said apertures for translating said sound tracks into electric currents flowing in a common channel, a recording galvanometer connected to said channel and positioned to form its record trace upon the record carried by said drum and means for shifting the relative positions of said apertures along said sound tracks by a predetermined proportional increment upon completion of each revolution of the drum.

6. A wave record analyzer comprising a rotatable drum for carrying a trace record, means for rotating said drum, a film drive sprocket geared to move concurrently with said drum, means for reversing the direction of rotation of said sprocket at the end of each such rotation to return a film driven by said sprocket to its initial position relative to the angular position of said drum, a plurality of reproducing apertures positioned to coact with a plurality of sound tracks recorded on said film, means coacting with said apertures for translating said sound tracks into electric currents flowing in a common channel, a recording galvanometer connected to said channel and positioned to form its record trace upon the record carried by said drum and means for shifting the relative positions of said apertures along said sound tracks by a predetermined proportional increment upon completion of each revolution of the drum, and additional means for individually adjusting the relative positions of said apertures.

7. A wave record analyzer comprising a rotatable drum for carrying a trace record, means for rotating said drum, a film drive sprocket geared to move concurrently with said drum, means for reversing the direction of rotation of said sprocket at the end of each such rotation to return a film driven by said sprocket to its initial position relative to the angular position of said drum, a plurality of reproducing apertures positioned to coact with a plurality of sound tracks recorded on said film, means coacting with said apertures for translating said sound tracks into electric currents flowing in a common channel, a recording galvanometer connected to said channel and positioned to form its record trace upon the record carried by said drum and means for shifting the relative positions of said apertures along said sound tracks upon completion of each revolution of the drum, and a movable gate interposed in line with said film and apertures for occulting certain thereof.

8. A wave record analyzer comprising a rotatable drum for carrying a trace record, means for rotating said drum, a film drive sprocket geared to move concurrently with said drum, means for reversing the direction of rotation of said sprocket at the end of each such rotation to return a film driven by said sprocket to its initial position relative to the angular position of said drum, a plurality of mutually slidable plates mounted parallel to the motion said film and each provided with a reproducing aperture positioned to coact with a sound track recorded thereon, a rocker arm, means for tilting said rocker arm by a predetermined increment at the end of each rotation of said drum, a connection between each of said plates and a different point on said rocker arm for sliding said plates proportionally and means for recording at the surface of said drum the sum of the densities of said sound tracks.

9. A wave record analyzer comprising a rotatable drum for carrying a trace record, means for rotating said drum, a film drive sprocket geared to move concurrently with said drum, means for reversing the direction of rotation of said sprocket at the end of each such rotation to return a film driven by said sprocket to its initial position relative to the angular position of said drum, a plurality of mutually slidable plates mounted parallel to the motion said film and each provided with a reproducing aperture positioned to coact with a sound track recorded thereon, a rocker arm, means for tilting said rocker arm by a predetermined increment at the end of each rotation of said drum, a connection between each of said plates and a different point on said rocker arm for sliding said plates proportionally, and an adjusting means interposed in each of said connections for sliding said plates individually irrespective of their proportional movement, and means for recording at the surface of said drum the sum of the densities of said sound tracks.

10. A wave record analyzer comprising a rotatable drum for carrying a trace record, means for rotating said drum, a film drive sprocket geared to move concurrently with said drum, means for reversing the direction of rotation of said sprocket at the end of each such rotation to return a film driven by said sprocket to its initial position relative to the angular position of said drum, a hinge pin mounted adjacent said sprocket drive, a slidable collar mounted on said hinge pin, a reproducing head hinged on said pin and including a plurality of mutually slidable reproducing apertures, means actuated by said sprocket drive gearing for sliding said collar on said hinge pin at each revolution of said drum, means within said reproducing head and actuated by movement of said collar for changing the relative positions of said apertures by predetermined proportional increments, and means including said apertures for recording at the surface of said drum the sum of the densities of a plurality of sound tracks recorded on a film driven by said sprocket.

FRANK RIEBER.